July 4, 1961 P. A. MILLER 2,991,207
LAMINATED WINDSHIELD
Filed Sept. 18, 1959
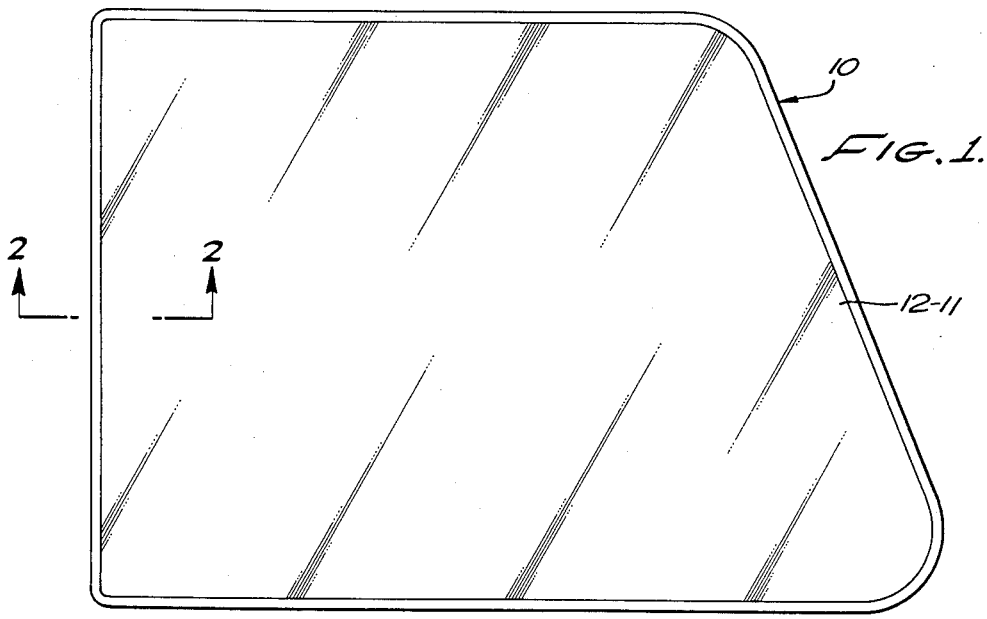
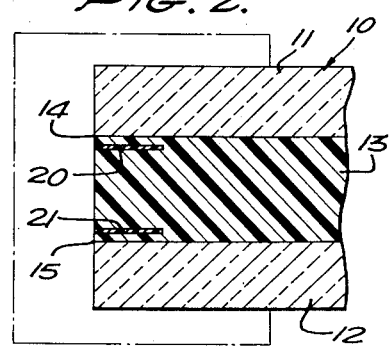
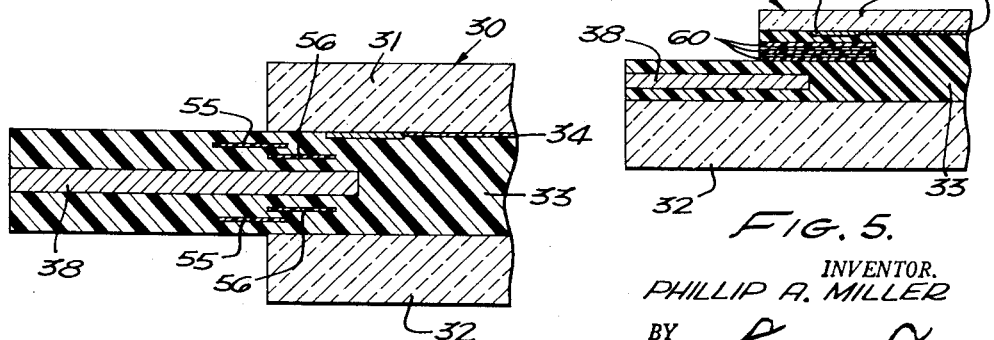
INVENTOR.
PHILLIP A. MILLER
BY
ATTORNEYS United States Patent Office 2,991,207
Patented July 4, 1961

2,991,207
LAMINATED WINDSHIELD
Phillip A. Miller, Sunland, Calif., assignor to The Sierracin Corporation, Burbank, Calif., a corporation of California
Filed Sept. 18, 1959, Ser. No. 840,909
5 Claims. (Cl. 154—2.74)

This invention relates to laminated parts such as windshields for aircraft and other vehicles and has particular reference to laminated parts comprising outer plies or face sheets of glass or a relatively rigid plastic material separated by a relatively flexible interlayer of plastic material such as polyvinyl butyral.

Parts of the type referred to find wide application as aircraft and other vehicle glazing materials such as in the fabrication of windshields, windows and other types of transparent enclosures. These parts are subject to severe stresses during fabrication and in service. The stresses may be due to thermal loads, such as occasioned by the heating operations during fabrication, or in service by low ambient temperatures or elevated temperatures such as in the case of electrically-heated glazing panels for aircraft. The coefficients of expansion of the materials of the face sheets and interlayer are widely different, the differences in expansions and contractions set up by such temperature conditions producing severe stresses. Other stresses may be caused by mechanical loads such as impacts from foreign objects, pressure differentials due to aircraft cabin pressurization, and the like. Such stresses tend to cause failures of the laminated parts, particularly delamination and chip pulling which most often originate at or near the edge of the part. Heretofore this problem has been overcome in part at least by interrupting the bond between the laminations at the edges of the part by the use of a parting agent to move the peak stresses interiorly of the part, thus reducing the tendency to failure by delamination of the edges. While this method is of some value, it is disadvantageous from the standpoint that the total bond area between the plies is reduced. One of the primary objects of the present invention is, therefore, to provide a laminated part in which improved means are provided for preventing delamination and chip pulling failures.

Another object of this invention is to provide a simple yet highly effective means for reducing the effectiveness of stresses tending to cause delamination failures of laminated parts.

Other objects and advantages of this invention it is believed will be readily apparent from the following detailed description of preferred embodiments thereof when read in connection with the accompanying drawings.

In the drawings:

FIGURE 1 is a plan view of a laminated windshield panel embodying the present invention.

FIGURE 2 is a sectional view taken substantially on the line 2—2 of FIGURE 1.

FIGURE 3 is a fragmentary sectional view of a modified form of the invention.

FIGURE 4 is a fragmentary sectional view of a further modified form of the invention.

FIGURE 5 is a fragmentary sectional view of a further modified form of the invention.

Referring now to the drawings, the windshield panel 10 is of generally conventional configuration, comprising a pair of face sheets 11 and 12 of glass or relatively rigid plastic material bonded together by means of an interlayer 13 of an impact-resistant material such as polyvinyl butyral. The panel is adapted to be mounted on an aircraft in a conventional mounting channel diagrammatically indicated by the phantom lines in FIGURE 2.

As indicated above, stresses caused by thermal or mechanical loads most commonly result in failure of the bonds between the interlayer and face sheets in the areas of the edges indicated 14 and 15. Means are provided for reducing the effectiveness of the stresses causing such failures and, as shown in FIGURES 1 and 2, these means may include the provision of a discontinuity or discontinuities in the interlayer in the edge area thereof. In the specific embodiment of FIGURES 1 and 2 this comprises a pair of incisions 20 and 21 cut into the interlayer inwardly from the edge thereof after fabrication of the laminate, the incisions extending completely around the periphery of the panel. As shown, the incisions preferably extend parallel to the plane of the interfaces between the interlayer and face sheets and are each spaced from the respective interface.

It has been found that such discontinuities are extremely effective in protecting the laminates from delamination due to stress. It is postulated that this is due in part at least to the fact that the discontinuities serve to reduce the area of interlayer material capable of loading the bonded interface.

The modified form of the invention illustrated in FIGURE 3 is shown as embodied in an electrically heated anti-fog panel 30 of the general type disclosed in Danford Patent No. 2,864,928, comprising a pair of relatively rigid face sheets 31 and 32 and an impact-resistant interlayer 33. The sheet 31 has applied to it a transparent, electrically conductive coating 34 and bus bar braids 35 which are suitably connected to a source of current for resistance heating of the coating and panel.

In the specific embodiment shown the interlayer 33 extends outwardly from the edges of the face sheets and is provided with a reinforcing member 38 for mounting the panel with conventional edge attachment means (not shown). This type of laminate is designed to withstand quite severe mechanical stresses and is known as a bird-resistant windshield panel. The discontinuities are here provided by a pair of strips 39 and 40 of a parting material such as cellophane, or other material incapable of forming a bond with the interlayer as strong as the bond between the interlayer and the face sheets. These strips are inserted in between plies of the interlayer material prior to fabrication of the laminate in which operation the interlayer plies become fused together to produce the customary monolithic interlayer. It is apparent from the drawings that the strips 39 and 40 overlap the peripheral edges of the respective face sheets 31 and 32. Strip 39, for example, extends within the interlayer 33 substantially parallel to the plane of sheet 31 and a portion of the discontinuity formed by the strip 39 extends substantially inwardly and outwardly from an imaginary plane perpendicular to the sheet 31 at the outermost point of bond between the interlayer 33 and sheet 31, the discontinuity intersecting such imaginary plane. Strip 40 has a similar relation with respect to the sheet 32.

The modification illustrated in FIGURE 4 embodies essentially the same structure as that of FIGURE 3 with respect to overlapping discontinuity strips 55. However, additional strips 56 are provided in this embodiment.

The modification of FIGURE 5 is embodied in an electrically heated anti-fog panel similar to that of FIGURE 3. Here, however, three discontinuities 60 are provided in vertically stacked arrangement.

It is believed that it will be apparent to those skilled in the art that the following advantages are obtained with the present invention: the peak shear stresses due to thermal or structural loads during fabrication or in service are reduced and removed from the vulnerable edge area; tension loads perpendicular to the interface are removed from the edge areas and relieved by deflection across the interlayer discontinuity whereby delamination will not proceed past the discontinuity; the overall bond area between interlayer and face sheets is not reduced; the load carrying capacity of the interlayer need not be reduced; the discontinuity need not permit the entry of moisture, dirt, or other deleterious agents; and in heated panels the bus bar braid is isolated from the shear gradient in the interlayer.

It should also be pointed out that the discontinuities need not in all cases be extended around the full periphery of the part, but that they may be restricted to areas felt to be critical, and can be used adjacent either or both of the face sheets.

From a standpoint of practical utility, the width of the discontinuity should be more than about twice the distance from the plane thereof to the bonded interface, and the distance from the plane of the discontinuity to the interface should be less than 40% of the interlayer thickness. Best results are obtained by spacing the discontinuity close to the interface, i.e., at a distance less than ¼ the thickness of the interlayer, but some improvement in resistance to stress-caused delamination is observed by placing a single discontinuity at the centerplane of the interlayer.

Having fully described my invention, it is to be understood that I do not wish to be limited to the details set forth, but my invention is of the full scope of the appended claims.

I claim:

1. A laminated part comprising a pair of relatively rigid sheets and an interlayer of an impact-resistant material interposed between said sheets, said interlayer extending outwardly from an edge of one of said sheets and having a discontinuity therein extending in the direction of said edge substantially parallel to the planes of the sheets, a portion of said discontinuity extending substantially inwardly and outwardly from a plane perpendicular to said one of said sheets, said plane extending from the outermost point of bond between the interlayer and said one of said sheets, said discontinuity intersecting said plane.

2. The article of claim 1 wherein said one of said sheets is provided with a transparent, electrically conductive coating at the interface between said sheet and said interlayer, and said article including means for connecting said coating to a source of current for resistance heating of said article.

3. The article of claim 1 wherein said discontinuity comprises a parting agent.

4. The article of claim 1 wherein said discontinuity extends around the entire periphery of said one of said sheets.

5. The article of claim 1 wherein the width of the discontinuity is equal to at least twice the distance between the plane of said discontinuity and the adjacent face sheet.

References Cited in the file of this patent

UNITED STATES PATENTS 2,650,890    Bledsoe _____ Sept. 1, 1953
2,697,675    Gaiser _____ Dec. 21, 1954